United States Patent [19]

Roncarelli

[11] 3,710,709
[45] Jan. 16, 1973

[54] FLAMBÉ FLAMER

[76] Inventor: Francesco D. Roncarelli, 51 West Main Street, Mystic, Conn. 06355

[22] Filed: Nov. 30, 1970

[21] Appl. No.: 93,644

[52] U.S. Cl............99/324, 99/345, 99/140 R, 206/72, 220/20, 220/23.8, 222/572
[51] Int. Cl................................A47j 36/24
[58] Field of Search.99/140 R, 419, 324, 444, 171 B, 99/171 CT, 345; 206/72; 220/20, 23.8; 263/48; 222/572, 113, 146

[56] References Cited

UNITED STATES PATENTS 3,516,837  6/1970  Klein........................99/144

OTHER PUBLICATIONS

The Gourmet Cookbook, Gourmet Dist. Corp., New York (1950) pp. 694 and 704

Primary Examiner—Morris O. Wolk
Assistant Examiner—Warren Bovee
Attorney—Alan Swabey

[57] ABSTRACT

A ladle-like flambéing utensil for containing and flambéing an alcoholic potion and dispensing it while flaming, made up of an open-topped shell having a central supply bowl and connected smaller side bowls for receiving overflow from the supply bowl for priming and pouring. The utensil is provided with a handle for manipulating it.

6 Claims, 4 Drawing Figures

PATENTED JAN 16 1973 3,710,709
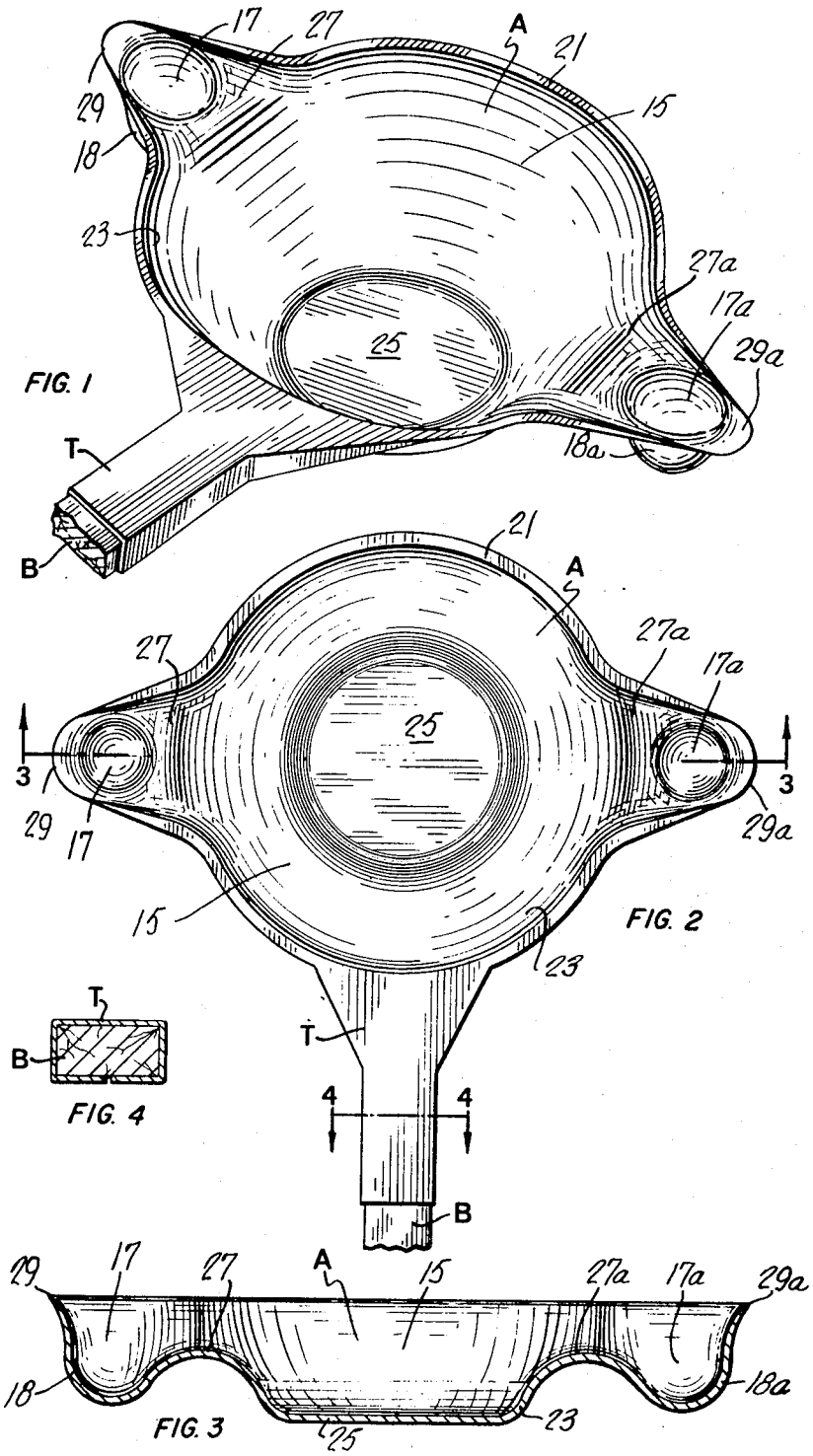
INVENTOR
Francesco D. RONCARELLI
*Alan Swabey*
ATTORNEY

3,710,709

FLAMBE FLAMER

BACKGROUND OF THE INVENTION

1. Field of the Invention

This invention relates to improvements in flambéing.

2. Description of the Prior Art

Flambéing, flaming, or flaring is described in "French Provincial Cooking" by Elizabeth David, Penguin Books Ltd., Harmondsworth, Middlesex, England, as a means of imparting to food a flavor nothing else can give. A flavored alcohol vehicle, for example, a spirit or liqueur, say a brandy, a whiskey (a scotch or other), a curaçao, or the like, used straight, or in any desired blend, is first ignited in a suitable utensil then warmed for several seconds, and when ready, poured flaming over the dish of food, in such a manner that the flames spread over the surface. This step can be spectacular, and, if carried out in a darkened dining room, can add greatly to the guests entertainment and anticipation of the taste sensation to come. After the flames have died down a concentrated essence is left which imparts a flavor to the food. Conventionally, the vehicle is heated in a small pot with a spirit lamp or candle.

SUMMARY OF THE INVENTION

It is an aim of the present invention to provide an improved way of flambéing in a special utensil in which the alcoholic vehicle is contained, is first ignited, then warmed, and from which it is finally poured onto the food.

The invention provides a flambéing utensil comprising an open topped shell formed with a central supply bowl and opposed minor priming bowls extending from it as small wings. A handle extends laterally from the central bowl intermediate the wings to provide means for holding the utensil level and for inclining it to employ one of the priming bowls as a spout. The shell has a surrounding rim substantially in the same plane throughout, defining its top, except at the junction of each priming bowl with the supply bowl where there is a weir part below the level of the rim providing access for liquid between supply bowl and priming bowl. Each priming bowl preferably tapers from the weir part to a pouring lip. Preferably the depth of the supply bowl is at least substantially twice that of a priming bowl.

In using the utensil, a flame is applied to the end of one of the priming bowls and allowed to envelop the tip. This lights the alcohol vehicle in the priming bowl. Manipulation of the utensil causes the flame to spread to the surface of the supply bowl. The flaming liquid is then poured onto the food using one of the priming bowls as a spout.

BRIEF DESCRIPTION OF THE DRAWINGS

Having thus generally described the invention, it will now be referred to in more detail by reference to the accompanying drawings, which illustrate a preferred embodiment, and, in which:

FIG. 1 is a top perspective view of the preferred utensil with the handle cut short for convenient showing;

FIG. 2 is a plan view of the utensil of FIG. 1, again with the handle cut short;

FIG. 3 is a horizontal cross-section along the line 3—3 of FIG. 2;

FIG. 4 is a horizontal cross-section along the line 4—4 of FIG. 2.

DESCRIPTION OF THE PREFERRED EMBODIMENTS

Referring more particularly to the drawings, the preferred form of utensil shown has the following construction. Generally speaking, the utensil is a ladle- or spoon-like vessel having an integral open-topped shell A made up of a major central bowl part 15 and opposed minor tapering bowl parts 17 and 17a extending laterally as wings of the central bowl part. The central bowl part has a wall 23 merging into a bottom 25. The minor bowl parts 17 and 17a have respective walls 18 and 18a.

A rim 21 surrounds the top of the shell A, always substantially in the same plane. The central bowl part 15 is substantially circular in overall cross-section and its wall 23 tapers inward from the rim 21 to merge with the flat bottom 25. The wall 23 adjacent to the bowl 17 stops short of the rim in a weir part 27 which merges with the wall 18 of the bowl 17. Likewise, at the other side, the wall 23 adjacent to the bowl 17a stops short of the rim in a weir part 27a which merges with the wall 18a of the bowl part 17a.

A handle B is connected to the shell centrally of the dish part 15, between the respective bowls 17, 17a. The handle preferably extends parallel to the plane of the rim 21, so that it forms an axis about which the vessel A can be rotated from the horizontal position so as to depress one or other of the bowls 17, 17a. The handle is preferably of wood or other non-heat conductive material. It may be joined to the vessel proper in any convenient manner. For example, in the construction shown, there is a part T extending from the edge of the main bowl 15, which is formed into a sleeve to receive the end of the wooden handle B.

Flambéing, according to the invention, is carried out as follows. The bowl 15 is filled with the required alcoholic medium, to the desired volume, to provide a supply pool. Then, the vessel is manipulated by the handle B so that the vehicle overflows the weir 27 into one of the side bowls, say the bowl 17, to provide in it a priming pool. Then, a priming flame (a match, candle or other) is applied just below the tip 29 so as to glow over the tip and ignite the alcoholic vehicle therein. By tilting the vessel so that the vehicle will run back over the weir into the supply bowl 15, the flame can be caused to spread over the entire surface of the vehicle in the shell A, and, in a few seconds, say ten, the vehicle in the shell will have gained the required heat for flambéing. The vessel is then manipulated so that the bowl 17 is tilted enough for the flaming medium to overflow its pouring lip 29 onto the food product being flambéd. By continued tilting and appropriately manipulating the utensil over the food product, the desired amount of medium can be spread from the shell A onto the food product so as to flambé-flavor it to the desired taste.

It should be noted that the conventional procedure in which the vehicle is first warmed and lighted is reversed, in that with the applicant's utensil the vehicle is first lighted and this warms it to the desired degree.

The diametrically opposite location of the respective priming bowls has the advantage that the utensil can be manipulated easily by a left- or right-handed person, and other locations of the priming bowls could present the danger of burning the hand of the person flambéing.

In the preferred construction shown, the main bowl has been shown of overall circular shape and the priming bowls of rounded tapered shape. This shape is convenient and aesthetic, but for reasons of design the utensil could be made of other shapes, for example, the supply bowl angular and the priming bowl angular or of other shape.

The characteristics of the utensil may be varied within the spirit of the invention. The shell may be of any suitable material such as, for example, various metals including alloys, burnt clay, feldspar, porcelain, vitreous material, or other liquid-containing material made according to conventional methods and of a weight used in tableware. The applicant prefers to use stainless steel of a preferred thickness within the range from about 18 to about 20 gauge, which can be the same throughout or may vary. The shell can also be made from sheet metal, formed into shape in a conventional manner, for example by drawing or pressing, or can be cast or forged from metal.

A typical shell has the following dimensions:
From tip of lip 29 to tip of lip 29a — about ¼ inch
Diameter of supply bowl 15 — 4 inches
Depth of bowl 15 from rim 21 to bottom 24 — 1/16 inch
Depth of bowl 17 from rim 21 to bottom of bowl — ½ inch
Dimension from top of rim 21 to top of weir 27 — ⅜ inch
Radius of curvature of weir 27 — ½ inch
From top of weir 27 to tip of lip 29 diagonally — 1⅝ inch
Depth of alcoholic medium in bowl 15 — 1 inch
Volume of bowl 15 when filled to top of weir 17 — 3 oz.
Volume of bowl 17 when filled to top of weir 27 — ½ oz.

Preferred dimensions are: diameter of about 1¾ inches to about 3⅞ inches, and priming bowl width at its point of greatest depth of about 3/16 inch to about 1 3/16 inches.

A large surface area is needed in the supply bowl so that the liquor may be quickly heated and have a "-spread" flame flow from the "beaks" at the side of the larger surface of the supply bowl. The important feature is that the "flowing flame" should be of such a nature and area so as to "spread cover" the area to be flamed.

The priming can be effected in one of the priming bowls, the flame spread over the supply bowl to the other priming bowl, and the flaming fluid flowed from either priming bowl onto the food to be flambéd.

Certain other important aspects of the invention should be noted as follows.

The preferred weir curve is as shown in FIG. 3 and is one that will overcome the surface tension and allow steady flow from the main bowl to the priming bowls.

As the heating of the alcohol solution reaches flame proportions, the surface tension is reduced, and there is no problem in pouring the flaming liquid back into the main bowl.

The angle of contact of the liquid with the surface of the weir will range from 12° to 20° even though the tensioned area, held back by the surface, forms its own curve up to 80° to 90°, related to the tangent at the apex of the weir curve. It depends on the force exerted by the mass behind the concave side of the tensioned area. With water, the above may well be 67–72 dynes per cm. at 70°F to 80°F, but with alcohol, the surface tension is cut to approximately 31.6 dynes/cm. plus or minus for 68 to 96 proof ethyl alcohol in water, at a range of 70°F. to 80°F.

It should also be noted that a rim 21 surrounds the top of the shell A, always substantially on the same plane, but the line tapers off about one-fourth inch before the spout of the priming bowls, leaving the spouts rimless. This is necessary for the flame applied to the tip of the spouts to overlap the spouts and assure a quick flame.

I claim:
1. A flambéing utensil, comprising,
   an open-topped shell for receiving an inflammable potion and having a central major supply bowl and to each side integral minor priming bowls adapted to receive overflow from the supply bowl for priming and pouring,
   and handle means connected to the central bowl for manipulating the bowl.
2. A utensil, as defined in claim 1, in which the shell has a surrounding rim substantially in the same plane throughout and defining its top, at the junction of each priming bowl with the supply bowl there being a weir part below the level of the rim baffling access for liquid between the supply bowl and each priming bowl up to a level below the rim.
3. A utensil, as defined in claim 1, in which each priming bowl tapers from said weir part to an extremity constituting a pouring spout.
4. A utensil, as defined in claim 1, in which the depth of each priming bowl is less than that of the supply bowl.
5. A utensil, as defined in claim 2, in which an outstanding lip surrounds the rim except at the extremity of each priming bowl.
6. A utensil, as defined in claim 2, in which each priming bowl tapers from said weir part to an extremity constituting a pouring spout, and an outstanding lip surrounds the rim except at the spout.

* * * * *